United States Patent [19]

Fujimoto et al.

[11] 3,953,860

[45] Apr. 27, 1976

[54] CHARGE AMPLITUDE DETECTION FOR INK JET SYSTEM PRINTER

[75] Inventors: Isao Fujimoto, Kunitachi; Takeshi Kasubuchi; Masahiko Aiba, both of Nara, all of Japan

[73] Assignees: Nippon Telegraph and Telephone Public Corporation, Tokyo; Sharp Kabushiki Kaisha, Osaka, both of Japan

[22] Filed: Mar. 12, 1974

[21] Appl. No.: 450,414

[30] Foreign Application Priority Data

Mar. 12, 1973 Japan ................................ 48-28686

[52] U.S. Cl. .................................................. 346/75

[51] Int. Cl.² .......................................... G01D 15/18

[58] Field of Search ........................................ 346/75

[56] References Cited

UNITED STATES PATENTS

| | | | |
|---|---|---|---|
| 3,769,632 | 10/1973 | Jolisburger et al. | 346/75 |
| 3,787,882 | 1/1974 | Fillmore et al. | 346/75 |
| 3,810,194 | 5/1974 | Tokunaga et al. | 346/75 |
| 3,836,912 | 9/1974 | Ghougasian et al. | 346/75 |

OTHER PUBLICATIONS

Ruddy, G. A.; Position and Synchronization Sensor for an Ink Jet Printer; IBM Tech. Disc. Bulletin, Vol. 15, No. 9, Feb. 1973, pp. 2785–2786.

*Primary Examiner*—Joseph W. Hartary
*Attorney, Agent, or Firm*—Stewart and Kolasch, Ltd.

[57] ABSTRACT

It is essential for an ink jet system printer of the charge amplitude controlling type that an ink drop separation rhythm is in correct phase relation with respect to the application of charging signals. Detection of such phase relation may be achieved by forming phase detecting ink drops in addition to printing ink drops, charging these phase detection drops with phase detection signals and then measuring the amplitude of the charges on the individual drops. One approach to detecting the amplitude of charge on the phase detecting drops is to establish a panel shaped or strip shaped detection electrode adjacent the wake of the ink drops thereby enabling said detection by virtue of electrostatic induction.

2 Claims, 7 Drawing Figures

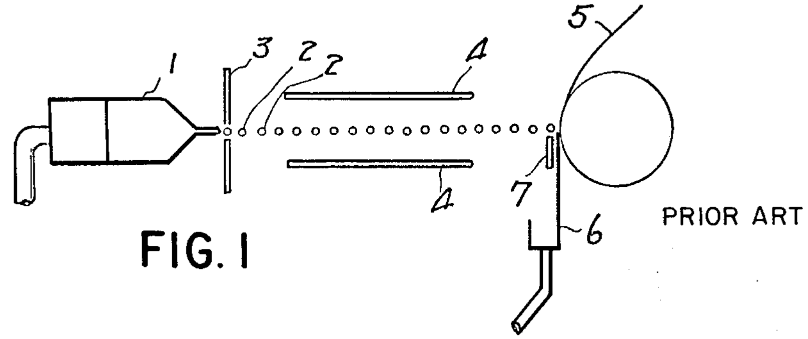
FIG. 1
FIG. 2
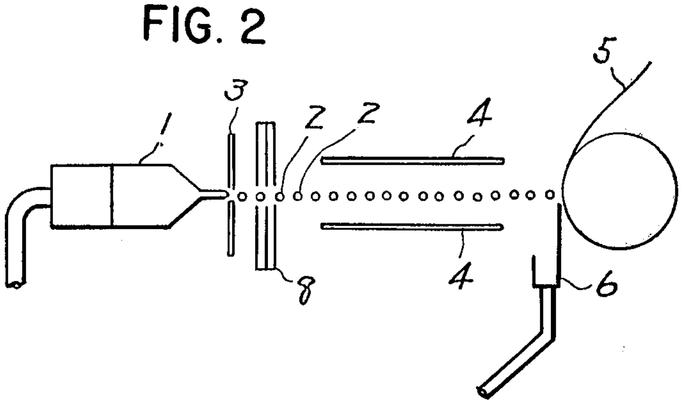
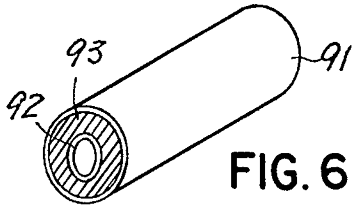
FIG. 6

CHARGE AMPLITUDE DETECTION FOR INK JET SYSTEM PRINTER

BACKGROUND AND SUMMARY OF THE INVENTION

The present invention relates to an improvement in an ink jet system printer of the charge amplitude controlling type.

In an ink jet system printer of the charge amplitude controlling type, wherein ink drops charged with charging signals are electrostatically deflected in accordance with the charge amplitude thereon as they pass through a high-voltage electric field thereby printing desired symbols such as alphabet characters, it is of importance that the application of the charging signals or the phase of the charging signals is timed to be in agreement with the ink drop separation rhythm. To this end, one approach has been proposed, wherein detection signals are formed and applied to a charging electrode which also receives the charging signals in order to detect the amplitude of charge on ink drops attributable to phase detection and, as a result, the charging signals are compensatively phase-controlled to be accurately synchronous with the ink drop formation rhythm. This approach has been disclosed in detail in our co-pending application Ser. No. 434,218, now abandoned, entitled "PHASE SYNCHRONIZATION FOR INK JET SYSTEM PRINTER", filed on Jan. 17, 1974.

One manner of detecting the charge amplitude is to establish a wire electrode closely adjacent to a beam gutter for recovery of waste ink drops not attributable to printing, the phase detecting ink drops striking directly against the wire electrode. However, since the electrically conductive ink liquid adheres to the electrode, there is a possibility of shunting the charge amplitude detecting electrode due to the ink liquid, which would exhibit a high impedance, and hence create a problem with respect to reliability. In addition, since the detecting electrode is positioned behind a pair of high voltage deflection plates and adjacent the beam gutter, the period required for the phase detecting ink drops to arrive at the charge amplitude detecting electrode after application of the phase detecting signals is comparatively long, for example, several milliseconds. This provides a time delay in phase correction.

Accordingly, it is an object of the present invention to provide a charge amplitude detection unit which exhibits high reliability and high response velocity.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objective, the device of the present invention has been developed to function to detect the charge amplitude on ink drops by virtue of electrostatic induction, wherein a detecting electrode with a strip or panel shape is provided adjacent the wake of the ink drops. Since the present arrangement detects the charge amplitude due to electrostatic induction without being actually in physical contact with the ink drops to be detected, the surface of the detecting electrode may be held in an optimum state at all times to ensure correct measurements. Moreover, since the present arrangement in no way interferes with the path of the ink drops, the detecting electrode may be positioned very closely behind a charging electrode to increase a response speed.

BRIEF DESCRIPTION OF THE DRAWINGS

The present invention will become more fully understood from the detailed description given hereinbelow and the accompanying drawings which are given by way of illustration only, and thus are not limitative of the present invention and wherein, FIG. 1 is a simplified illustration of an ink drop system printer equipped with the prior art charge amplitude detecting arrangement;

FIG. 2 is an illustration of an ink drop system printer containing an embodiment of the present invention;

FIG. 5(*b*) is a cross-sectional view looking in the direction B of FIG. 4; and

FIG. 6 is a perspective view of another embodiment of the present invention.

DESCRIPTION OF THE PREFERRED EMBODIMENTS

Figure 5:
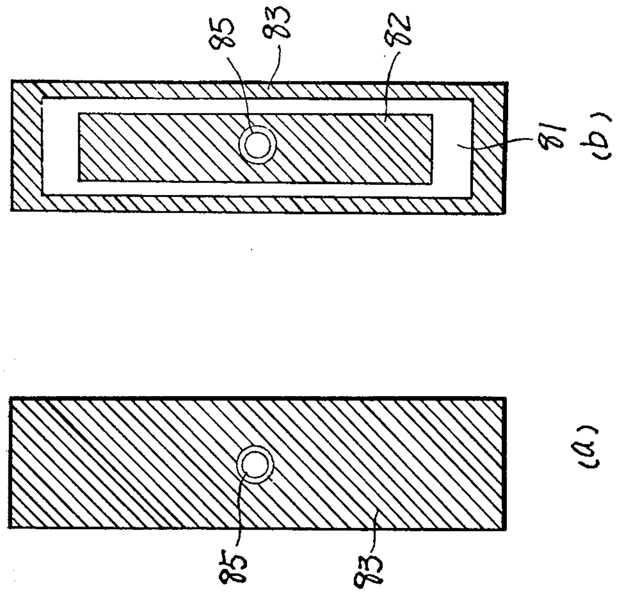
FIG. 5(*a*) is a cross-sectional view looking in the direction A of FIG. 4.

Referring now to the drawings, and to facilitate an understanding of the present invention, the prior art charge amplitude detection arrangement will be first described with reference to FIG. 1.

Ink liquid issuing under pressure from a nozzle 1 having an ultrasonic vibrator is broken into ink drops 2 at a frequency equivalent to the excitation frequency of the ultrasonic vibrator. The ink drops 2 are charged in accordance with charging signals by means of a charging electrode 3 and deflected in accordance with the charge amplitude as they pass through high voltage deflection plates 4. Then, the ink drops 2 used for printing reach a writing medium 5. A beam gutter 6 is provided for recovery of waste ink drops not used for printing. A charge amplitude detection electrode 7 positioned adjacent the beam gutter 6 arrests phase detecting drops to detect the charge amplitude thereon. As noted earlier, the aforementioned problems cannot be solved by the use of teachings of the prior art.

Referring now to FIG. 2 wherein like elements corresponding to those of FIG. 1 are indicated by like numerals, a charge amplitude detecting unit 8 of the present invention is positioned out of but in close proximity to the wake of the ink drops 2. Detection of the charge amplitude on the ink drops 2 is accomplished by utilizing electrostatic induction which occurs upon the passing of the ink drops 2 carrying the charge thereon adjacent to the detecting unit 8. The positioning of the detecting unit is provided just behind the charging electrode 3 because the existance of the detecting unit 8 does not interfere with movements of the ink drops 2. This arrangement improves response characteristics of the charge amplitude detecting unit. The surface of the detecting electrode may be eliminated to ensure accurate measurement because the detecting unit 8 is not actually in physical contact with the ink drops 2.

Figure 4:
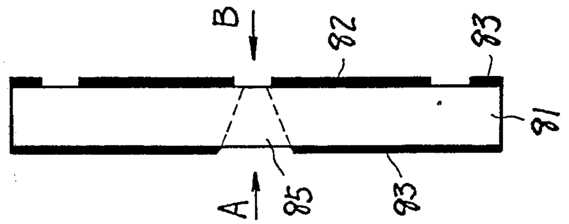
FIG. 4 is a fragmentary view showing a spaced-apart component of the embodiment of FIG. 3.
Figure 3:
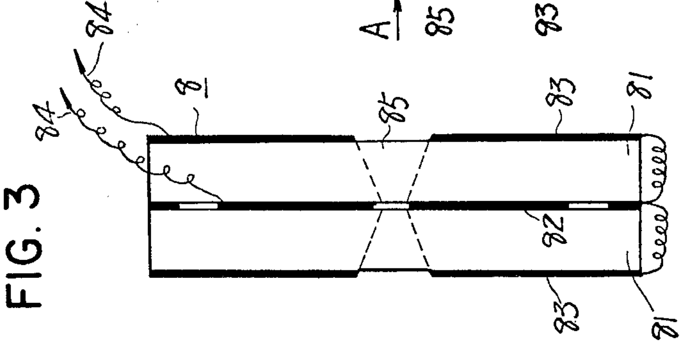
FIG. 3 is a detailed fragmentary view showing the embodiment of FIG. 2.

FIGS. 3 to 5 inclusive show an example of the charge amplitude detecting unit of the present invention. This unit 8 comprises a pair of double-sided print boards 81, a detecting electrode 82, a shield electrode 83 and output wires 84. An opening 85 is formed in the print board 81 and in the detecting electrode 82 in such a manner so as to detect the charge amplitude on the ink drops 2 due to electrostatic induction occurring upon the passing of the ink drops 2 through the opening 85.

The steps for assemblying the detecting unit 8 are to form two electrode plates, namely, the detecting electrode 82 and shield electrode 83 on both surfaces of the print board 81 in a desired pattern by the etching technique and to adhere the two print boards 81 together in a manner that the detecting electrode 82 intervenes or is disposed therebetween.

FIG. 6 is a modification wherein tube-shaped shield electrode 91 and tube-shaped detection electrode 92 are coaxially attached together with the use of electrically insulating adhesives 93. With such arrangement the ink drops 2 are allowed to pass therethrough and the charge amplitude thereon may be sensed by virtue of electrostatic induction.

Although the foregoing embodiments are organized in a way that the ink drops pass through a space surrounded by the detecting electrode, alternatively, the detecting unit may consist of only panel electrodes or wire electrodes positioned adjacent the wake of the ink drops.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A charge amplitude detector unit for an ink jet system printer comprising two electrically insulating plates each having first and second major surfaces and provided with openings extending through said surfaces in corresponding positions, said openings being aligned for the passage of ink drops therethrough, a detecting electrode disposed between the first major surfaces of the two insulating plates, and having a corresponding opening defined therethrough in registry with said openings in said plates, said opening being dimensioned such that the amplitude of charges on ink drops passing through said openings induces charge amplitude detection signals in said detecting electrode by electrostatic induction occurring upon the passing of said ink drop through said openings, shielding electrodes on said second major surfaces surrounding said openings, and a pair of signal wires connected to the detecting electrode and one of the two shielding electrodes, respectively, for transmitting said electrostatically induced charged amplitude detection signals from said detection unit.

2. In an ink jet system printer, in combination, a nozzle for issuing ink drops, a charging electrode disposed near said nozzle for charging the ink drops in correspondence with the printing information, a pair of deflection plates provided on opposite sides of the wake of the ink drops for deflecting the ink drops in accordance with the amplitude of charges on said drops, a writing medium provided for receiving said ink drops, and a charge amplitude detection unit positioned adjacent the wake of the ink drops in relatively close downstream proximity with said charging electrodes for detecting the amplitude of charges on the drops by virtue of electrostatic induction; said detection unit comprising:

a detecting electrode; shield electrode means adjacent said detecting electrode for shielding said detecting electrode from the electric fields established by said charging electrode and said deflection plates, and a pair of signal wires connected one to said detection electrode and one to said shield electrode means for transmitting electrostatically induced charge amplitude detection signals from said detection unit;

said detecting electrode comprising an electrically conductive plate having an opening defined therein which completely surrounds said wake of said ink drops and through which said ink drops pass in sufficient proximity to said plate to electrostatically induce a charge on said plate representative of the charge on each of said ink drops passing through said defined opening; and wherein, the said charge amplitude detection unit further comprises electrically insulating plate means supporting said shield electrode means and having an opening for the passing of ink drops therethrough, said detecting electrode being substantially totally contained within the insulating plate means and having said defined opening in said detecting electrode in registry with said opening in said insulating plate means whereby the amplitude of the charges on the ink drops is detected by means of electrostatic induction occurring upon the passing of said ink drops through the opening;

and further wherein said electrically insulating plate means comprises two such plates each having first and second major surfaces and provided with openings in corresponding positions, said openings being aligned with the wake of the said ink drops, said detecting electrode being disposed between the first major surfaces of the two insulating plates, and said shield electrode means comprises two shielding electrodes for covering each of the second major surfaces of the insulating plates, and said signal wires being connected to the detecting electrode and one of the two shielding electrodes, respectively.

* * * * *